United States Patent

[11] 3,589,015

| [72] | Inventor | Emile Cellier<br>Coteau de Boissy Le-Vivie-Du-Lac, Savoie, France |
|---|---|---|
| [21] | Appl. No. | 852,612 |
| [22] | Filed | Aug. 25, 1969 |
| [45] | Patented | June 29, 1971 |
| [32] | Priority | Sept. 12, 1968 |
| [33] | | France |
| [31] | | 50,379 |

[54] PROTRACTORS
7 Claims, 10 Drawing Figs.

| [52] | U.S. Cl. | 33/75 |
|---|---|---|
| [51] | Int. Cl. | B43l 13/00 |
| [50] | Field of Search | 33/75, 76, 97, 94 |

[56] References Cited
UNITED STATES PATENTS

| 346,519 | 8/1886 | Tybjerg | 33/75 |
|---|---|---|---|
| 2,594,574 | 4/1952 | Marsden | 33/75 |

FOREIGN PATENTS

| 1,073,495 | 6/1967 | Great Britain | 33/75 |
|---|---|---|---|

*Primary Examiner* — Harry N. Haroian
*Attorney* — Alexander & Dowell

ABSTRACT: A protractor comprises a flat table provided with a semicircular dial, this table carrying a supporting member adapted to receive a removable block on which is pivotally mounted an arm cooperating with the graduations of the dial. The supporting member and the removable block have centering means to make sure that the axis of rotation of the arm is accurately disposed at the center of the dial. The block is provided with a longitudinally slidable rule which is disposed between the block and the table when the said block is centered by the supporting member, a portion of the upper edge of the rule corresponding to the horizontal diameter of the dial. Means are provided to lock the rule with respect to the removable block and also to lock the arm with respect to the block. The flat rear sides of the arm and of the rule are in the same plane in order to bear uniformly against any planar surface and more particularly against the surface of the table.

PROTRACTORS

This invention relates to apparatus or protractors used to measure angles, more particularly in workshops.

Such apparatus generally comprise a semicircular dial and an arm pivoted at the center thereof. The pivoted arm may be carried by a separate support adapted to be removably fixed along the rectilinear base of the semicircular dial. It has also been proposed to provide this support with a horizontally slidable rule which defines with the arm an angle the value of which may be determined by means of the dial.

It is an object of the present invention to improve the apparatus of the kind in question.

In accordance with this invention the apparatus comprises a flat table on the surface of which the dial is engraved. The table carries a supporting member having centering means adapted to removably receive a block formed with centering means complementary of those of the supporting member, the said block carrying the pivot of an arm adapted to cooperate with the dial of the table. The block is provided with a slidable rule adapted to be interposed between the said block and the surface of the table when the block is accurately centered by the supporting member, the dial indicating the angle of the arm with the rule.

It is an important feature of the present invention that the rear sides of the arm and of the rule, i.e. the sides adapted to face the table, are situated in the same plane so as to bear uniformly on the table without requiring the provision of any depression or recess in the flat surface of the latter. Thus the assembly formed by the arm and the rule may be applied against any planar surface of a workpiece, when desired.

The invention further concerns means to frictionally lock the rule with respect to the arm.

Figure 2:
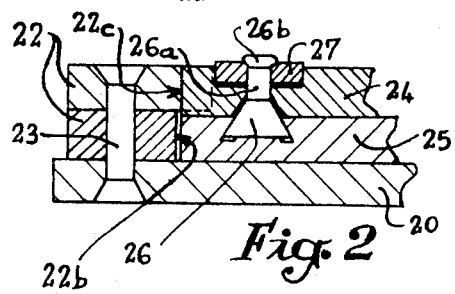
FIGS. 2 and 3 are enlarged fragmental sections taken along lines II–II and III–III of FIG. 1.
Figure 3:
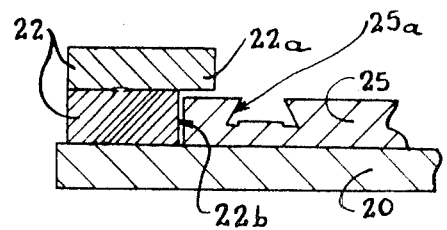

In the embodiment illustrated the apparatus or protractor comprises a table 20 on which angle graduations 21 have been engraved. Table 20 thus forms the semicircular dial of the apparatus and in order to simplify the present description it may be assumed that it is situated in a vertical plane. An horizontally elongated supporting member 22 is fixed onto table 20 along the lower edge thereof, so as to extend substantially from the left vertical side thereof to a point situated just beyond the vertical line of the center of graduations 21. In the example illustrated the supporting member 22 is secured to table 21 by means of rivets 23 and it is realized in the form of two superposed flat bars of unequal width or height in such manner as to determine along the upper edge of the said member an upwardly opening longitudinal groove 22b defined by the front side of table 20 and by a rectangular upwardly protruding rib 22a (FIG. 3). This rib 22a is recessed along most of its length in order to determine a rectangular depression 22c of somewhat smaller depth than groove 22b, as indicated in FIG. 2.

Figure 4:
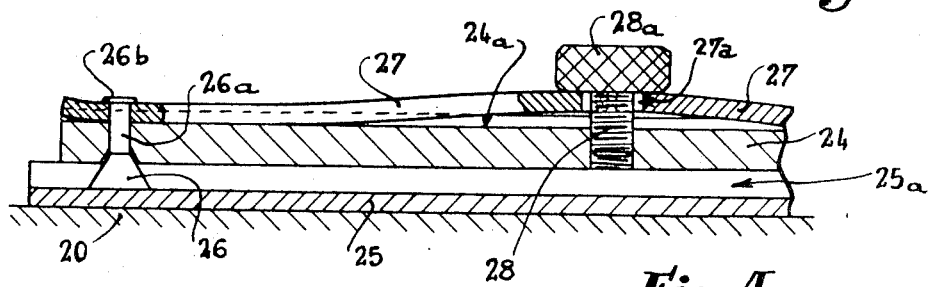
FIG. 4 is an enlarged fragmental section taken along line IV–IV of FIG. 1.
Figure 5:
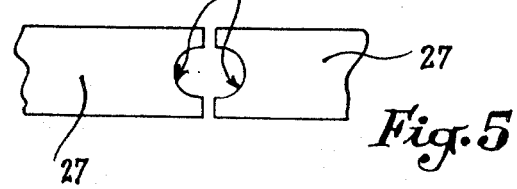
FIG. 5 is a front view showing the facing ends of the resilient blades adapted to frictionally lock the rule with respect to the block.

Depression 22c is adapted to receive without any noticeable longitudinal clearance a rectangular block 24 slidably mounted on a rule 25. As illustrated in FIG. 3 the front side of rule 25 is formed with a longitudinal dovetailed groove 25a in which are slidably disposed two conical heads 26 (FIGS. 2 and 4) which extend into corresponding conical depressions provided in the rear side of block 24 in the vicinity of the ends thereof. Each head 26 is in one with an upwardly extending cylindrical pin 26a (FIG. 2) which passes through a hole provided in block 24, each pin 26a having at its upper end a flat flanged portion 26b. The front side of block 24 is formed with a longitudinal groove 24a of flat rectangular cross section which receives two relatively thick spring blades 27 disposed in succession, the outer end of each being formed with a hole for passage of a pin 26a (FIG. 4) while its inner end is recessed as indicated at 27a in FIG. 5, the facing recesses 27a, of substantially semicircular shape, defining an approximately circular passage for a screw 28 (FIG. 4) screwed in block 24. This screw 28 has a milled cylindrical head 28a adapted to bear against the facing inner ends of blades 27. As indicated in FIG. 4, these blades are slightly curved in their portion adjacent to pins 26b in such manner that when screw 28 is actuated, their outer ends act on the flanged portions 26b of pins 26a and tend to pull same forwardly (i.e. upwardly in FIGS. 2 and 4) together with the corresponding conical heads 26 thereof which are thus frictionally locked in groove 25a. In other words blades 27 act as a pair of resilient arcuate force-transmitting levers adapted to roll against the bottom of groove 24a, and since the point or zone of contact or fulcrum of each lever is situated close to the corresponding pin 26a, the force exerted by screw 28 is multiplied by this lever gearing and a quite effective locking action of heads 26 within groove 25a may be easily obtained, the resiliency of blades 27 preventing any damage to the parts.

It is to be observed that the lower edges of block 24 and of rule 25 are substantially situated in the same horizontal plane and that therefore rule 25 does not engage the bottom of groove 22b so as to have no influence whatever on the centering of block 24 in depression 22c. Furthermore in order to facilitate an accurate machining of the bottom of this depression, the latter is provided somewhat deeper in its central portion so as to only leave two short end portions 22d (FIG. 2) which come into contact with block 24, these portions being easily ground to the accurate height.

Figure 1:
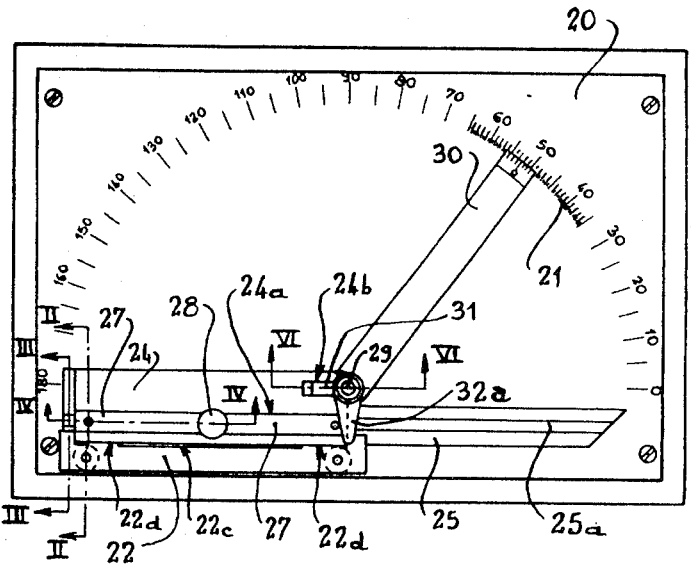
FIG. 1 is a view in elevation of a protractor according to the present invention.

Block 24 carries at its inner upper angle a cylindrical pin 29 (FIG. 6) which forms a pivot for an arm 30 adapted to cooperate with graduations 21, as illustrated in FIG. 1, pin 29 being of course centrally disposed with respect to the said graduations when block 24 is mounted in the depression 22d of the supporting member 22. For this purpose the free end of arm 30 is bevelled, its transverse edge being curved concentrically to pin 29, and this edge has a pointer, or preferably a vernier, as illustrated in FIG. 1. Pin 29 is formed with a flat circular head 29a received in a corresponding circular depression of the rear side of arm 30. It comprises in front of its cylindrical portion a hexagonal portion 29b followed by a screw-threaded portion 29c. A lug 31 having a hexagonal perforation is mounted on portion 29b, the curved end of this lug being received in a lateral depression 24b provided in the front side of block 24 so as to prevent rotation of pin 29, while a nut 32 having an actuating button 32a is screwed on portion 29c in order to clamp arm 30 between head 29a and block 24.

Figure 6:
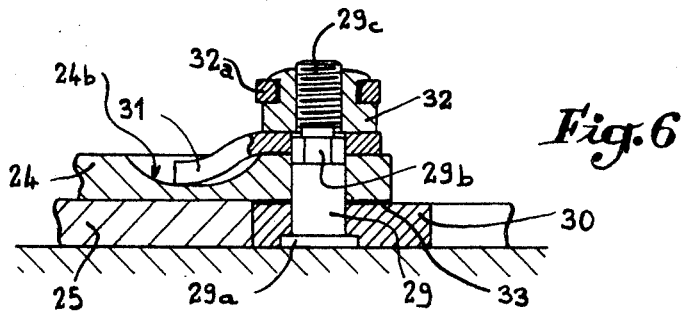
FIG. 6 is an enlarged fragmental section taken along line VI–VI of FIG. 1.

As illustrated in FIG. 6, the arrangement is such that the rear sides of rule 25 and of arm 30 may be simultaneously applied against table 20. In other words arm 30 has substantially the same thickness as rule 25, minus the thickness of an intermediate washer 33 when such a washer is provided.

Figure 7:
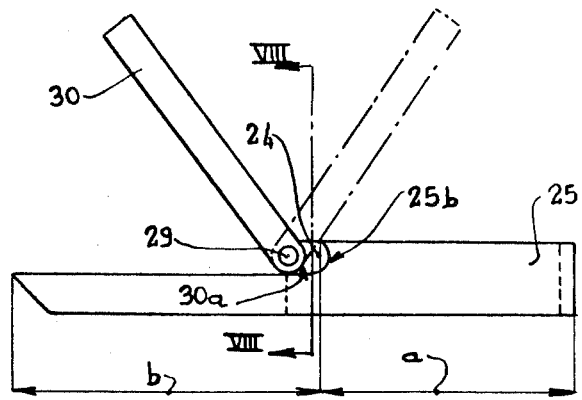
FIG. 7 is a rear view of the removable unit including the block, the rule, and the pivoted arm.
Figure 8:
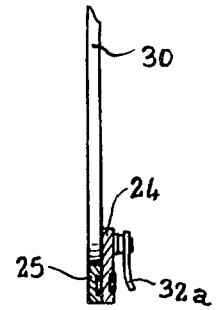
FIG. 8 is a section taken along line VIII–VIII of FIG. 7.

Rule 25 is not of uniform width or height along its length. As seen in FIG. 1 it comprises a right-hand portion a (FIG. 7) the width of which is such that the upper edge of the rule is substantially flush with the upper edge of block 24, and a left-hand portion b in which its upper edge is situated at a substantially lower level and is tangent to the semicircular inner end 30a of arm 30. Portions a and b are connected with each other by an intermediate recessed shoulder 25b of arcuate shape capable of surrounding the inner end 30a of arm 30.

Figure 9:
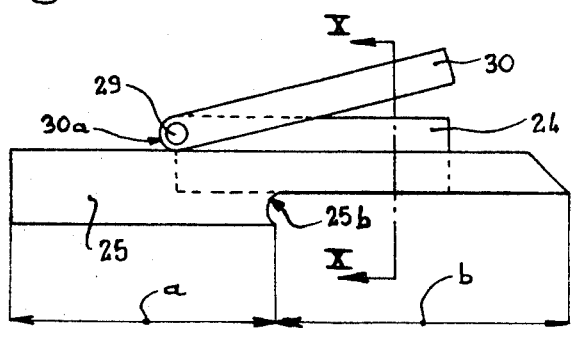
FIG. 9 is a rear view similar to FIG. 7, but the rule being inverted in position with respect to the block.
Figure 10:
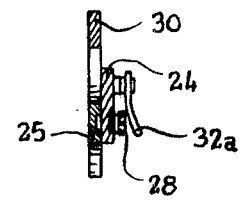
FIG. 10 is a section taken along line X–X of FIG. 9.

It will be understood that for relatively small angles the rounded end 30a of arm 30 may be disposed within the recessed shoulder 25b. Under such conditions the facing edges of arm 30 and of rule 25 define the angle almost up to its apex. For somewhat greater angles rule 25 may be allowed to slide towards the left in FIG. 1 by releasing screw 28, thus enabling arm 30 to define the angle desired, as indicated in dash lines in FIG. 7. In the case of angles above 90° it is also possible to use the supplemental angle, as for instance in FIG. 7 the angle of arm 30 with portion a of rule 25, table 20 bearing two rows of figures. It is further possible to turn rule 25 about an axis normal to its vertical sides (FIGS. 9 and 10). In such a case arm 30 may rotate through 180°, but the angles can no more be drawn in the close vicinity of their apices.

In both cases the rear sides of the movable arm 30 and of the associated rule 25 remain in the same plane and may therefore be exactly applied on any flat surface.

In use, when it is desired to dispose arm 30 at a predetermined angle with respect to rule 25 frictionally locked with block 24 by means of screw 28, block 24 is first fully engaged into depression 22c–22d, whereby the geometrical axis of rotation of arm 30 is accurately centered with respect to graduations 21. Arm may thus be displaced angularly while its angle with respect to rule 25 is read on the graduations with the help of the vernier provided along the terminal edge of the arm. When the desired angle is obtained, arm 30 may be frictionally locked in position by actuating button 32a and the unit formed by block 24, rule 25, and arm 30 may be removed from member 22 and from table 20. This unit may then be used for drawing an angle on any flat surface, or for checking the angle formed by two surfaces. Alternatively button 32a being loosened, rule 25 may be applied against a surface and arm 30 may be rotated until it bears uniformly against another surface at an angle with the former. Button 32a is then operated so as to lock arm 30 and the unit 30–25–24 is disposed on table 20 with block 24 fully engaged into depression 22c–22d. The value of the angle may be read on graduations 21.

I claim:
1. An apparatus for measuring angles comprising:
   a flat supporting table having graduations angularly disposed along an arc of a circle, said arc having a center;
   a supporting member fixed on said table, said supporting member being formed with centering means;
   a block formed with centering means complementary of the centering means of said supporting member in order that said block may be disposed at a well-defined position against said table, said block having a front side and a rear side;
   a rule having a flat rear side and a flat front side parallel to each other, said rule having its front side slidably disposed against the rear side of said block so as to bear against said table when said block is centered by said supporting member;
   means to guide said rule with respect to said block for longitudinal displacement of said rule thereon;
   means to frictionally lock said rule with respect to said block;
   pivoting means carried by said block, said pivoting means defining an axis of rotation normal to said table and concentric to the graduations thereof when said block is centered by said supporting member with said rule being disposed between said block and said table;
   an arm having a first end mounted on said pivoting means against the rear side of said block and a second end cooperating with said graduations when said block is centered by said supporting member, said arm having a front side and a rear side, with said rear side of said arm being in the same plane as the rear side of said rule; and
   means to angularly lock said arm with respect to said block.

2. In an apparatus as claimed in claim 1, said centering means of said supporting member being disposed at a distance from said table at least equal to the thickness of the portion of said rule applied against the rear side of said block.

3. In an apparatus as claimed in claim 1, said rule having in its front side a longitudinal groove of substantially dovetailed cross section and said means to guide said rule with respect to said block comprising conical heads protruding from the rear side of said block to be slidably received in said groove.

4. In an apparatus as claimed in claim 3, said conical heads being movable on said block perpendicularly to the rear side thereof and said means to frictionally lock said rule with respect to said block acting on said conical heads to urge same towards said front side of said block.

5. In an apparatus as claimed in claim 4:
   said conical heads being two in number, each extending through said block in the form of a substantially cylindrical pin slidably guided in said block, with each of said pins having an enlarged portion at its end remote from the rear side of said block;
   said front side of said block having a groove of substantially rectangular cross section parallel to the groove of said rule, with each of said pins protruding from the bottom of said groove; and
   said apparatus further comprising a pair of resilient blades disposed in succession in said groove of said block, each blade having an outer end formed with a hole through which one of said pins is passed and a notched inner end adjacent the inner end of the other one of said blades; and an actuating screw passed through said notched ends, said screw having an enlarged head and said resilient blades being curved with their concavity facing outwardly of said block, in such manner that the pressure of the head of said screw on the inner ends of said blades may generate a tractive force applied to the enlarged portion of said pins.

6. In an apparatus as claimed in claim 1, said rule having a first and a second longitudinal edge, said first longitudinal edge being in the form of a continuous straight line along the whole length of said rule, while said second longitudinal edge is formed of a first and a second successive straight portions parallel to said first edge but with said first portion being situated at a shorter distance from said first edge than said second portion, and said first and second portions being connected with each other by an intermediate shoulder of concavely curved shape; and the inner end of said arm being of semicircular contour concentric to said pivoting means and substantially tangent to the portion of said second edge nearer to said first edge with the diameter of said semicircular inner end being substantially equal to the difference between the distances between said first longitudinal edge and respectively said first and second portions of said second longitudinal edge.

7. In an apparatus as claimed in claim 6, said means to guide said rule with respect to said block being symmetrical in cross section with respect to a plane perpendicular to the rear and front side of said rule, parallel to the first edge of said rule and disposed substantially midway between said first longitudinal edge of said rule and said first portion of said second longitudinal edge thereof, in order that said rule may be mounted on said block at two different positions with said semicircular inner end of said arm always tangent to said rule.